United States Patent [19]

Miller

[11] 4,394,442
[45] Jul. 19, 1983

[54] POST-STRETCH WATER-DISPERSIBLE SUBBING COMPOSITION FOR POLYESTER FILM BASE

[75] Inventor: Conrad E. Miller, Hendersonville, N.C.

[73] Assignee: E. I. Du Pont de Nemours and Company, Wilmington, Del.

[21] Appl. No.: 357,908

[22] Filed: Mar. 15, 1982

[51] Int. Cl.[3] ............................................. G03C 1/78
[52] U.S. Cl. .................................... 430/532; 427/173; 427/40; 428/480; 428/482; 428/910; 430/533
[58] Field of Search ................ 430/532, 533; 428/480, 428/482, 910; 427/171, 173, 40

[56] References Cited

U.S. PATENT DOCUMENTS

| | | |
|---|---|---|
| 3,563,942 | 2/1971 | Heiberger ........................ 260/29.2 |
| 3,919,773 | 11/1975 | Pears .................................... 264/37 |
| 4,181,528 | 3/1980 | Work et al. ......................... 428/474 |
| 4,304,851 | 12/1981 | McGrail et al. ................... 430/533 |
| 4,307,174 | 12/1981 | Noonan et al. .................... 430/215 |

Primary Examiner—Jack P. Brammer

[57] ABSTRACT

To improve adhesion of a hydrophilic photographic emulsion to a hydrophobic polyester film base the latter is energy-treated as by electrical discharge or flame treatment, and then given a sub-coating composed of an aqueous dispersion of a copolyester modified with a sulfonated aromatic compound.

6 Claims, No Drawings

POST-STRETCH WATER-DISPERSIBLE SUBBING COMPOSITION FOR POLYESTER FILM BASE

BACKGROUND OF THE INVENTION

This invention relates to photographic film elements, and particularly to transparent photographic film elements having an improved anchoring substratum (commonly known as a subbing or "sub" layer) between the film base and the water-permeable colloid layer or layers disposed thereon.

It is common practice in the manufacture of photographic films to employ as a film support a dimensionally stable biaxially oriented heat set polyester such as polyethylene terephthalate. Polyethylene terephthalate films are conventionally prepared, for example, by catalytic ester-interchange reaction between dimethyl-terephthalate and ethylene glycol, followed by catalytic polymerization under vacuum of the resulting dihydroxyethylene terephthalate monomer. The final polymer is then cast as a film, biaxially oriented by stretching, and heat set. Films made in this manner have a relatively hydrophobic surface, and do not adhere well to hydrophilic coatings containing gelatin. Accordingly, it is customary to employ several intermediate layers between the support and the photographic emulsion layer in order to effect suitable adhesion between the two. Generally, two intermediate layers are used. The first is a chlorine-containing copolymer resin coating applied to the polyester support after the latter has been cast into film but before it has been stretched to obtain the desired biaxial orientation and heat set. This resin coating provides good adhesion to the polyester, and at the same time provides good adhesion to the second subbing layer, which is applied after stretching and heat setting. This second layer is usually composed of a hydrophilic colloid such as gelatin, which in turn adheres well to the gelatin-containing photographic emulsion layer. Before applying the photographic emulsion layer, the dual-subbed polyester support is heat-relaxed to achieve dimensional stability.

The trouble with this system is that a certain amount of scrap film is formed in the process of biaxial orientation and heat setting of the polyester film, and it cannot be recycled because the first subbing layer has already been applied, and it is incompatible with the composition of the recycle. This prevents recycle of the polyester film unless the first subbing layer is removed beforehand, and its removal is costly and difficult, making this undesirable. As a result much film has to be discarded instead of being recycled. The present invention provides a solution to this problem.

SUMMARY OF THE INVENTION

When an aqueous dispersion of a modified copolyester, more specifically a linear copolyester modified with a sulfonated aromatic compound of the type disclosed in U.S. Pat. No. 3,563,942 "Aqueous Dispersion of Copolyesters Modified with a Sulfonated Aromatic Compound" (1971) is coated on a polyester film base (support) after the latter has been biaxially oriented, heat set, and energy-treated, i.e., surface treated by electrical discharge, or flame or chemical treatment, this first subbing layer will firmly bond to the polyester support and will also supply excellent wet and dry anchorage and adhesion to a gelatin-containing second subbing layer applied later. This makes it possible to recycle any scrap polyester film that was formed during the stretching step, since the modified copolyester subbing layer of this invention will not have been applied at that stage. The disclosure of U.S. Pat. No. 3,563,942 is hereby incorporated by reference.

According to this invention, the modified copolyester can be described generically as a water-dispersible linear copolyester having a relative viscosity of from about 1.3 to about 1.7 (measured as a 0.58% solution of m-cresol at 25° C.) which comprises the reaction product of substantially equimolar equivalents of at least two dicarboxylic acids and at least one dihydric alcohol, said dicarboxylic acid equivalents being supplied by a plurality of acid reactants which, based on a total of 100% (molar) acid equivalents, includes from about 0.1% (molar) to about 10% (molar) equivalents of an aromatic sulfonated compound having a structural formula:

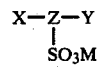

wherein
M is a monovalent cation selected from the group of an alkali metal, ammonium, substituted ammonium, and quaternary ammonium;
X and Y are monovalent radicals individually selected from the group having structural formulas consisting of

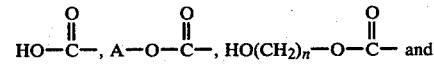

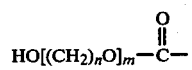

wherein A is a lower alkyl group having 1–5 carbon atoms, and m and n are positive integers of less than 20 with n being greater than 1; and Z is a trivalent aromatic radical.

These copolyesters are not branched, crosslinked, or used with a crosslinking agent.

DETAILED DESCRIPTION OF THE INVENTION

The modified copolyester which is used in the first subbing layer of this invention is formed from one or more aliphatic diols, and terephthalic acid, isophthalic acid, an aliphatic dicarboxylic acid, and a sodium salt of a sulfonated isophthalic acid, preferably the sodium salt of 5-sulfoisophthalic acid. Preferably, the aliphatic diols are ethylene glycol and diethylene glycol, employed in molar ratios of from 5:95% diethylene glycol:ethylene glycol, to 95:5%; and the dicarboxylic acid equivalents are supplied by the following acids: about 25–35% (molar) terephthalic acid; about 45–55% (molar) azelaic acid; about 15–20% (molar) isophthalic acid; and about 0.5–10% (molar) sodium 5-sulfoisophthalate acid. The function of the latter is to render the copolyester water-dispersible, and accordingly enough must be used to accomplish this. Within these ranges it is particularly preferred to employ about 70% (molar) diethylene glycol and 30% (molar) ethylene glycol, and the acid equivalents in the following amounts: about 30% (molar) terephthalic acid; about 45% (molar) azelaic; about 15% (molar) isophthalic acid; and about 10% (molar)

sodium 5-sulfoisophthalate. These copolyesters form excellent coating compositions in an aqueous medium.

In place of the ethylene glycol and diethylene glycol referred to above, other aliphatic diols of 3-10 carbon atoms may be employed, singly or in combination. The aliphatic dicarboxylic acid component is not limited to azelaic acid but could include other saturated aliphatic dicarboxylic acids, such as malonic, succinic, glutaric, adipic, pimelic, suberic, and sebacic.

Polyester films useful in the practice of this invention are formed from the polyesterification product of dimethyl terephthalate and ethylene glycol and further made according to the teachings of Alles, U.S. Pat. No. 2,779,684 "Polyester Films and Their Preparation" (1957) and Whinfield et al, U.S. Pat. No. 2,465,319 "Polymeric Linear Terephthalatic Esters" (1949) and the patents referred to in the specifications thereof. Other suitable films are the polyethylene terephthalate/isophthalates of British Pat. No. 766,290 and Canadian Pat. No. 566,672 and those obtained by condensing terephthalic acid and dimethyl terephthalate with propylene glycol, diethylene glycol, tetramethylene glycol or cyclohexane 1,4-dimethanol (hexa-hydro-p-xylene alcohol). The photographic film bases of Bauer et al, U.S. Pat. No. 3,052,543 "Photographic Film Base and Film" (1962) may also be used. Films prepared from these polyesters are particularly suitable because of their dimensional stability and excellent optical clarity.

It is believed that energy treatment of the polyester base by, e.g., electrostatic or flame treatment, creates active sites on the base surface, believed to be carboxyl groups, which in turn react with and couple to the modified copolyester molecules. Typical patents on this subject are U.S. Pat. No. 3,072,483 "Photographic Element Comprising Polyethylene Terephthalate Film Base" (1963) and U.S. Pat. No. 3,753,765 "Conductive Carbon Antistatic Backing For Photographic Film" (1973).

The coating weights of the first subbing layer of this invention can vary widely. The lower limit is about 0.1 mg/dm$^2$ and the upper limit is set only by the amount which can be coated and dried economically. However, the preferred range is 0.5-5 mg/dm$^2$. The coating can be applied to the polyester support base by any conventional coating technique, e.g., skim, bar coating, curtain and extrusion coating, followed by drying and thermal curing to effect the desired adhesion. Preferably the sub layer also contains chrome alum or other hardening agent to reduce tackiness.

The subbing layer is applied to one or both sides of the polyester support; the resulting substrate is coated with a gelatin-containing second subbing layer, and then with a conventional silver halide emulsion, e.g., gelatino-silver bromide, chloride, iodide, or mixtures of these; the silver halide emulsion can, of course, contain dyes, sensitizers, binders, and other additives conventional in the photographic art.

The invention is illustrated by the following Examples.

EXAMPLE 1

The following ingredients were mixed and further reacted as taught in U.S. Pat. No. 3,563,942 to prepare a water-dispersible polyester (WDP) resin:

| Ingredient | Amount (mole %) |
|---|---|
| ethylene glycol | 26 |
| diethylene glycol | 34 |
| terephthalic acid | 12 |
| isophthalic acid | 6 |
| azelaic acid | 18 |
| 5-sulfoisophthalic acid (Na salt) | 4 |
| tetraisopropyl titanate (polymerization catalyst) | 183 ppm |

The following subbing solutions were prepared:

| | Ingredient | Amount (g) |
|---|---|---|
| (a) | Resin Sub Composition | |
| | Distilled Water | 1875.0 |
| | WDP - 10% dispersed in H$_2$O | 625.0 |
| | Colloidal Silica (Ludox LS)[1] | 19.6 |
| | Chrome Alum (10% in H$_2$O) | 14.0 |
| | pH | 8.64 |
| | (Total WDP in resin sub is 2.5 weight %) | |
| (b) | Gel Sub Composition | |
| | Distilled Water | 2650.0 |
| | 10% gelatin in H$_2$O | 202.0 |
| | 5% Cetyl Betaine (Product BCO®[1] wetting agent) in H$_2$O | 26.9 |
| | 1% neomyacin sulfate in H$_2$O | 7.6 |
| | 10% Chrome alum in H$_2$O | 3.6 |
| | ethyl alcohol | 112.0 |
| | Teflon fluorocarbon polymer 30C[1] | 0.5 |
| | pH | 6.28 |

[1]Ludox LS®, Product BCO® and Teflon 30C® are all registered trademarks of E. I. du Pont de Nemours and Co., Wilmington, DE The resin coating solution was applied to a biaxially oriented polyethylene terephthalate film support whose surface had been energy-treated with a propane: oxygen flame (1.15±0.05 stoichiometric ratio). The film support was 4 mil (0.0102 cm) thick and the coating weight (dried) was about 2.0 to 2.5 mg/dm$^2$. The dried resin layer was then overcoated with the gel sub composition to obtain a dried gel coating weight of about 0.67 to 0.74 mg/dm$^2$. Both layers were applied using a conventional air knife with about 5 inches (water) pressure (12.7 cm) and a coating web speed of about 150 feet/min (45.72 m/min). The coatings were dried at 85° C. and the film then heat relaxed about 1.6 minutes at 138° C.

A conventional, negative-working, coarse grained gelatino-silver iodobromide X-ray type emulsion was then applied over the gel sub. The emulsion/overcoated film was then dried at room temperature for 4 hours, was exposed, developed, and given anchorage tests as follows:

Dry Anchorage:
1. Scribe 24¼" (0.64 cm)×¼" squares through the emulsion using a suitable template and stylus.
2. Remove any particulates that result.
3. Place a piece of ¾" (1.9 cm) No. 600 Scotch Tape (3M Co., Minneapolis, MN) over the scribed pattern.
4. Rub tape firmly with finger pressure to obtain good contact.
5. Grasp end of tape and quickly rip from the surface at a 30° angle.
6. Count number of squares of emulsion removed by this process.

Wet Anchorage:
1. Soak film in water for 5 minutes.
2. Place wet film on a smooth, hard surface.

3. Draw a line on the sample through emulsion with a stylus.
4. Rub over scribed area ten times with a moistened rubber eraser having a 500 g weight attached thereto.
5. Measure amount of emulsion peel-back.

The film samples prepared in this example were excellent and exhibited essentially no wet or dry anchorage problems.

EXAMPLE 2

Example 1 was repeated except for the level of WDP in the resin subbing solution which was varied as follows:

| SAMPLE | Wt. % WDP |
|--------|-----------|
| A | 5 |
| B | 2.5 |
| C | 1.25 |

Three samples of energy-treated polyethylene terephthalate film supports were coated with the three resin subbing solutions to form first subbing layers, each of which was then overcoated with gel sub as described in Example 1. Photographic emulsions and overcoats were then applied. These samples were then exposed to light, and processed in conventional photographic developer and fixer. The samples were then washed and dried and given the anchorage tests of Example 1, with the following results:

| SAMPLE | ANCHORAGE | |
|--------|-----------|------|
|        | WET | DRY |
| A | Good | Good |
| B | Good | Good |
| C | Good | Good |

EXAMPLE 3

Example 1 was repeated except for the level of WDP in the resin subbing solution which was varied as follows:

| SAMPLE | Wt. % WDP |
|--------|-----------|
| A | 4.0 |
| B | 2.5 |
| C | 1.0 |

Three samples of energy-treated film support (Ex. 1) and three samples of film support which were not energy-treated were coated with the three resin subbing solutions to form a first subbing layer. Each layer was then overcoated with gel sub and subsequently a photographic emulsion layer and overcoat as taught in Example 1. Each sample was exposed and processed, and the wet and dry anchorage tests run as previously described. In the case of the samples in which the film support had first been energy-treated, the anchorage was good. In the case of the nonenergy treated samples the coatings simply washed off during processing, indicating complete anchorage failure.

EXAMPLE 4

The coating from Example 1 was held for four months at room temperature. Anchorage tests were unchanged, indicating the remarkable stability of this subbing layer.

EXAMPLE 5 (BEST MODE)

A large sample (suitable for plant production) of water dispersible polyester was made as follows:

| Ingredient | Amount (lbs.) |
|------------|---------------|
| Polyester (see Ex. 1) | 40 |
| Deionized H$_2$O | 360 |

These ingredients were mixed for four days in a stainless steel drum at 40° C. and then the pH was adjusted from 4.24 to 7.1 with 250 ml 1.5N NaOH.

A subbing solution was made from the following ingredients:

| Ingredient | Amount (lbs.) |
|------------|---------------|
| Deionized H$_2$O | 114 |
| Colloidal Silica (Ex. 1.) | 31 |
| Chrome Alum (10% in H$_2$O) | 14 |
| Wetting Agent (Ex. 1) | 16 |
| Mix - Adjust pH to 5.10 with 1.5N NaOH | |
| WDP from above | 400 |

This subbing solution was then coated on biaxially oriented polyethylene terephthalate film (4 mil, 0.0102 cm thick), the surface of which had been energy-treated with a propane:oxygen flame (1.15±0.5 ratio) using an air knife a 7.5", 24.6 cm, H$_2$O pressure to a dried thickness of about 2.0 mg/dm$^2$). The resin sub was overcoated with gel sub a 6.7" (20.4 cm) H$_2$O pressure (air knife) to a dried thickness of about 0.74 mg/dm and the film was heated relaxed at 137°-138° C. for about 1.5 minutes. Samples were coated with emulsion and overcoated, exposed, processed, dried, and tested for wet and dry anchorage as in Example 1. The anchorage of all samples was good.

I claim:

1. An article of manufacture comprising an energy-treated biaxially oriented polyester film base coated with
   (1) a subbing layer applied from an aqueous dispersion of a linear copolyester having a relative viscosity of from about 1.3 to about 1.7 measured as a 0.58% solution in m-cresol at 25° C. which comprises the reaction product of substantially equimolar equivalents of at least two dicarboxylic acids and at least one dihydric alcohol, said dicarboxylic acid equivalents being supplied by a plurality of acid reactants which, based on a total of 100% (molar) acid equivalents, includes from about 0.1% (molar) to about 10% (molar) equivalents of an aromatic sulfonated compound having a structural formula,

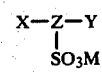

wherein:
M is a monovalent cation selected from the group of an alkali metal, ammonium substituted ammonium, and quaternary ammonium;

X and Y are monovalent radicals individually selected from the group having structural formulas consisting of

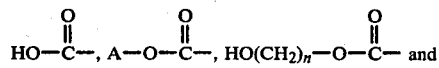

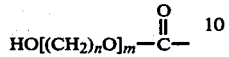

wherein

A is a lower alkyl group having 1–5 carbon atoms; m and n are positive integers of less than 20 with n being greater than 1; and Z is a trivalent aromatic radical;

and wherein said copolyester is not branched, cross-linked, or used with a crosslinking agent; and (2) a gelatin-containing layer contiguous thereto.

2. The article of manufacture of claim 1 wherein the energy-treated biaxially oriented polyester film base is polyethylene terephthalate.

3. A photographic element comprising the article of manufacture of claim 1 having a photosensitive silver halide emulsion layer on said contiguous gelatin-containing layer (2).

4. The photographic element of claim 3 wherein the water-dispersible copolyester is prepared from
(1) ethylene glycol and diethylene glycol, employed in molar ratios of from 5:95% diethylene glycol-:ethylene glycol, to 95:5%;
(2) dicarboxylic acid equivalents supplied by the following acids: about 25–35% (molar) terephthalic acid; about 45–55% (molar) azelaic acid; and about 15–20% (molar) isophthalic acid; and
(3) about 0.5–10% (molar) sodium 5-sulfoisophthalate.

5. A method of preparing a photographic film having a polyester film base comprising:
a. extruding the film base, stretching it in two directions and heat-setting,
b. energy-treating the film base,
c. applying to at least one side of the film base an aqueous dispersion of a linear copolyester modified with a sulfonated aromatic compound, as further defined in claim 1, and
d. coating the resulting substrate successively with
(1) a gelatin-containing subbing layer, and
(2) a gelatino-silver halide emulsion.

6. The method of claim 5 wherein coatings (c) and (d) are applied to both sides of the energy-treated film base.

* * * * *